United States Patent
Lin et al.

(10) Patent No.: US 9,224,052 B2
(45) Date of Patent: Dec. 29, 2015

(54) METHOD FOR IN-IMAGE PERIODIC NOISE PIXEL INPAINTING

(71) Applicant: Industrial Technology Research Institute, Hsinchu (TW)

(72) Inventors: Che-Tsung Lin, Hsinchu (TW); Yu-Chen Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 91 days.

(21) Appl. No.: 14/064,706

(22) Filed: Oct. 28, 2013

(65) Prior Publication Data

US 2014/0169695 A1    Jun. 19, 2014

(30) Foreign Application Priority Data

Dec. 19, 2012  (TW) .............................. 101148467 A

(51) Int. Cl.
| | | |
|---|---|---|
| *G06K 9/40* | (2006.01) | |
| *G06K 9/00* | (2006.01) | |
| *G06T 5/00* | (2006.01) | |
| *G06T 5/50* | (2006.01) | |

(52) U.S. Cl.
CPC ............ *G06K 9/00791* (2013.01); *G06T 5/005* (2013.01); *G06T 5/50* (2013.01); *G06T 2207/10016* (2013.01); *G06T 2207/20144* (2013.01); *G06T 2207/20224* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 5,780,719 | A * | 7/1998 | VanDam ..................... | 73/29.01 |
| 6,320,176 | B1 | 11/2001 | Schofield et al. | |
| 6,621,923 | B1 * | 9/2003 | Gennetten ..................... | 382/162 |
| 7,612,356 | B2 | 11/2009 | Utida et al. | |
| 7,613,322 | B2 * | 11/2009 | Yin et al. ..................... | 382/103 |
| 2007/0003108 | A1 | 1/2007 | Chinomi et al. | |
| 2009/0265061 | A1 | 10/2009 | Watanabe et al. | |
| 2011/0043624 | A1 * | 2/2011 | Haug ............................ | 348/135 |
| 2012/0011119 | A1 | 1/2012 | Baheti et al. | |

FOREIGN PATENT DOCUMENTS

| | | |
|---|---|---|
| CN | 2227861 (Y) | 5/1996 |
| CN | 100385461 C | 4/2008 |
| CN | 101470010 (A) | 7/2009 |
| CN | 102139674 (A) | 8/2011 |
| CN | 102186089 (A) | 9/2011 |

(Continued)

OTHER PUBLICATIONS

Hung, Kuo-Ming et al., A Novel Image Inpainting Technique Based on Bandelet Transform, IEE Computer Society; Second International Conference on Computer Modeling and Simulation, 2010, pp. 133-136, (published before this application Oct. 2013).

(Continued)

*Primary Examiner* — Eueng-Nan Yeh
(74) *Attorney, Agent, or Firm* — Muncy, Geissler, Olds & Lowe, P.C.

(57) ABSTRACT

A method for in-image periodic noise pixel inpainting is provided. It is determined whether a current frame includes periodic noise pixels, and locations of periodic noise pixels are identified. Non-periodic-noise pixels in a reference frame are utilized to inpaint the periodic noise pixels in the current frame.

13 Claims, 5 Drawing Sheets

(56) References Cited

FOREIGN PATENT DOCUMENTS

| | | |
|---|---|---|
| CN | 202160220 (U) | 3/2012 |
| JP | S6414700 (A) | 1/1989 |
| JP | 2002109699 (A) | 4/2002 |
| JP | 2004325113 (A) | 11/2004 |
| JP | 2006311299 (A) | 11/2006 |
| JP | 2007036668 (A) | 2/2007 |
| JP | 2007099261 (A) | 4/2007 |
| JP | 2007145251 (A) | 6/2007 |
| JP | 2007226300 (A) | 9/2007 |
| JP | 2007282060 (A) | 10/2007 |
| JP | 2007316790 (A) | 12/2007 |
| JP | 2007320390 (A) | 12/2007 |
| JP | 2008007079 (A) | 1/2008 |
| JP | 2008007090 (A) | 1/2008 |
| JP | 2008017311 (A) | 1/2008 |
| JP | 2008048094 (A) | 2/2008 |
| JP | 2008055958 (A) | 3/2008 |
| JP | 2009002797 (A) | 1/2009 |
| JP | 2009061975 (A) | 3/2009 |
| JP | 2009083680 (A) | 4/2009 |
| KR | 20100053719 (A) | 5/2010 |
| TW | 466192 (B) | 12/2001 |
| TW | M316829 (U) | 8/2007 |
| TW | 201034877 A1 | 10/2010 |
| TW | 201101849 A1 | 1/2011 |
| TW | 201113831 A1 | 4/2011 |
| TW | 201121820 (A) | 7/2011 |
| WO | WO-2006/024247 A1 | 3/2006 |
| WO | WO-2007/018145 (A1) | 2/2007 |

OTHER PUBLICATIONS

Ling, Chih-Hung et al., Human Object Inpainting Using Manifold Learning-Based Posture Sequence Estimation, IEEE Transactions on Image Precessing, Nov. 2011, pp. 3124-3135, vol. 20, No. 11.

Ardis, Paul, A. et al., Self-Similarity Inpainting, 16th IEEE International Conference on Image Processing, 2009, pp. 2789-2792, (published before this application Oct. 2013).

Tang, Nick C. et al., Video Inpainting on Digitized Vintage Films via Maintaining Spatiotemporal Continuity, IEEE Transactions on Multimedia, Aug. 2011, pp. 602-613, vol. 13, No. 4.

Wang, Haomian et al., Video Inpainting for Largely Occluded Moving Human, IEEE International Conference on Multimedia and Expo, 2007, pp. 1719-1722, (published before this application Oct. 2013).

Yong, Zhu et al., A New Oriented-Diffusion Image Inpainting Framework for Striped Texture Images, IEEE Computer Society; International Forum on Information Technology an Applications, 2009, pp. 79-84, (published before this application Oct. 2013).

* cited by examiner

METHOD FOR IN-IMAGE PERIODIC NOISE PIXEL INPAINTING

This application claims the benefit of Taiwan application Serial No. 101148467, filed Dec. 19, 2012, the disclosure of which is incorporated by reference herein in its entirety.

TECHNICAL FIELD

The disclosure relates to a method for in-image periodic noise pixel inpainting.

BACKGROUND

Motorized vehicles (e.g., automobiles) become popular in the daily life. In additional to the constant progress in perspectives of power, driving safety requirements for automobiles are becoming higher.

A driver usually identifies other objects in front and/or next to his/her automobile with his/her naked eye. To enhance safety, a forward-looking safety warning system installed in an automobile is available. The forward-looking safety warning system, generally installed behind a windshield in the front of an automobile, captures images in front of the automobile and identifies obstacles in the images, so as to remind the driver to keep a safety distance or to prevent the driver from dangerous driving behaviors. However, in adverse weather conditions such as rainstorms, the recognition rate of the forward-looking safety warning system may be significantly degraded. Periodic noise pixels (e.g., wiper objects swinging back and forth) in the images may partially or periodically block recognition targets (e.g., pedestrians, automobiles, traffic signs) of the forward-looking safety warning system. Consequently, the forward-looking safety warning system may make a misjudgment, implying that the driver driving under such circumstances may be dangerous.

Although a technique for determining if image is influenced by rain is available, there is no technique capable of determining whether periodic noise pixels (e.g., wiper objects) are present in the images and determining whether to filter out the periodic noises. Although a rain streak elimination method was proposed, it is inapplicable to the forward-looking safety warning system. A main reason is that, removing of rain streaks in the images is less significant than removing wiper objects in the images. A solution for clarifying foggy images was also proposed. Nonetheless, as wipers are considered as the most significant noise source once they are activated, such solution is also not capable of removing the interference coming from wipers.

SUMMARY

The disclosure is directed to a method for in-image periodic noise pixel inpainting. The method determines whether a current frame includes periodic noise pixels, and identifies locations of periodic noise pixels. Non-periodic-noise pixels in a reference frame are utilized to inpaint the periodic noise pixels in the current frame.

According to one embodiment, a method for in-image periodic noise pixel inpainting is provided. The method includes: determining whether a current frame comprises a periodic noise pixel group, and identifying locations of pixels forming the periodic noise pixel group in the current frame if the current frame comprises the periodic noise pixel group; matching a plurality of non-periodic-noise pixels in the current frame with a plurality of non-periodic-noise pixels in a reference frame to obtain a pixel relationship between the current frame and the reference frame; and selecting corresponding pixels from the reference frame to inpaint the periodic noise pixel group in the current frame according to the locations of the pixels forming periodic noise pixel group in the current frame and the pixel relationship.

DETAILED DESCRIPTION

Figure 1:
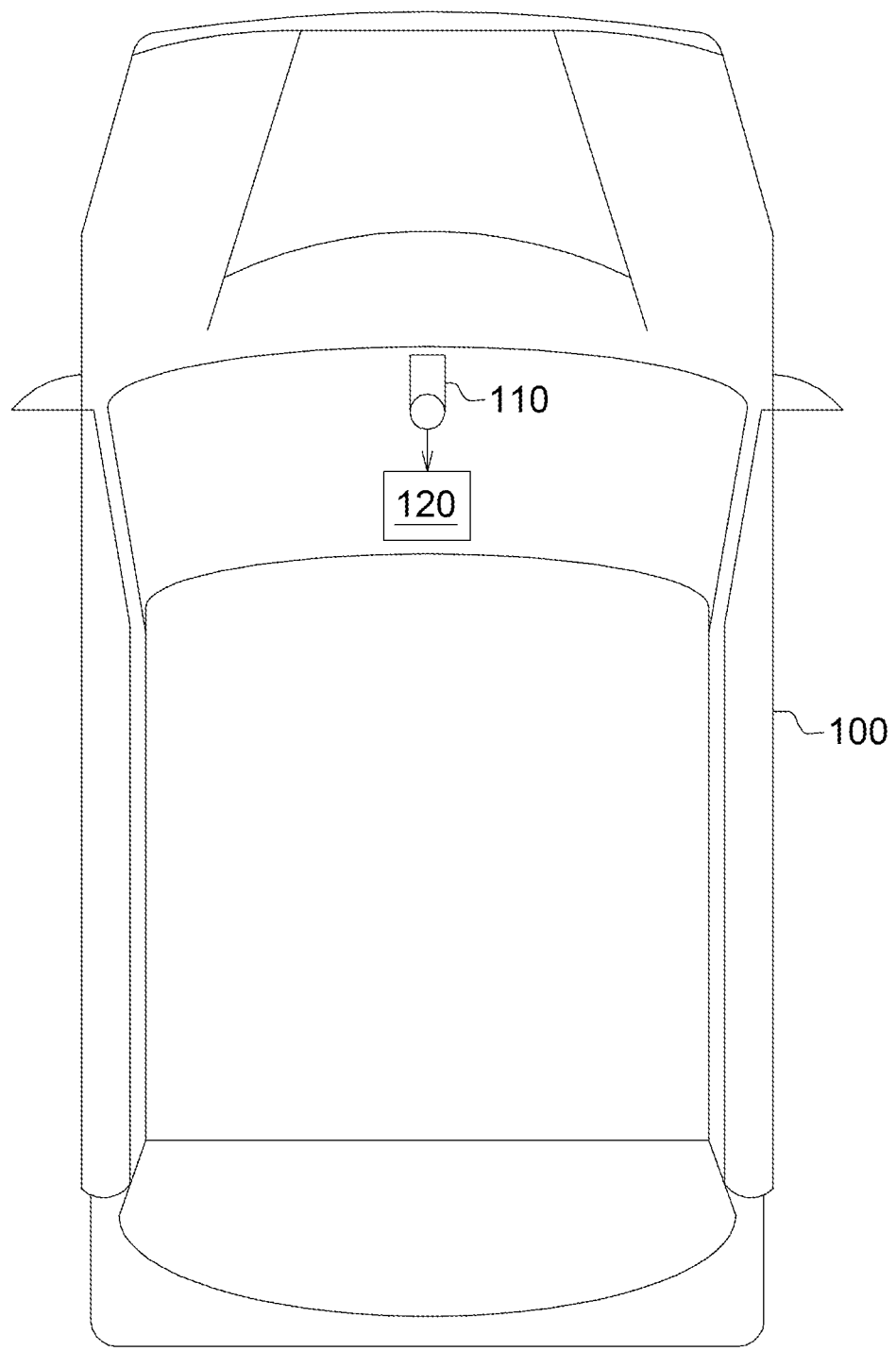
FIG. 1 is a schematic diagram of an automobile which is installed with a forward-looking safety warning system having built-in method for inpainting a wiper object according to one embodiment.

In the following detailed description, for purposes of explanation, numerous specific details are set forth in order to provide a thorough understanding of the disclosed embodiments. It will be apparent, however, that one or more embodiments may be practiced without these specific, details. In other instances, well-known structures and devices are schematically shown in order to simplify the drawing.

A method for in-image periodic noise pixel inpainting is provided by the disclosure for inpainting an in-image periodic noise pixel group (e.g., a wiper object). Even in adverse weather conditions such as rainstorms, obstacles such as pedestrians, other automobiles, and traffic signs, may still be recognized.

In one embodiment, by image segmentation and image inpainting, in-image periodic noise pixels are inpainted. A wiper object is one type of in-image periodic noise, and "inpainting a wiper object in a current frame" referred in embodiments below is an example of "inpainting periodic noise pixels in a current frame". For the current frame, the image segmentation technique identifies a plurality of pixels occupied by the wiper object (to be referred to as a wiper pixel group) in the current frame (or said, the image segmentation technique identifies location of the wiper object in the current frame), and matching on a plurality of non-periodic-noise pixels (to be referred to as non-wiper pixels) in the current frame with a plurality of non-wiper pixels in a reference frame (e.g., a previous frame or a earlier frame) to obtain an affine transformation matrix. The affine transformation matrix describes a pixel relationship between the to-be-repaired frame and the reference frame. According to the affine transformation matrix, corresponding pixels are selected from the reference frame to inpaint the wiper pixel group occupied by the wiper object in the current frame. Thus, the wiper object can be eliminated from the current frame to obtain an inpainted current frame without the wiper object (i.e. the inpainted current frame is not blocked by the wiper object). The image without the wiper object is inputted into a forward-looking safety warning system to prevent the obstacle recognition of the forward-looking safety warning system from being interfered by the periodic noise pixels (such as the wiper object), thereby ensuring driving safety.

FIG. 1 shows a schematic diagram of an automobile 100. The automobile 100 is installed with an image capturing unit 110 and a forward-looking safety warning system apparatus 120 having built-in in-image periodic noise pixel inpainting according to one embodiment.

The image capturing unit 110 captures an image outside a window in the front of the automobile. When a wiper is activated in the rain, an image captured by the image capturing unit 110 may contain wiper objects. For example, the image capturing unit 110 is an image sensor, such as one or any combination of an infrared image capturing device, a photoelectric coupling element and a complementary metal-oxide semiconductor (CMOS) photosensitive element.

The image captured by the image capturing unit 110 is forwarded to the forward-looking safety warning system apparatus 120 having built-in in-image periodic noise pixel inpainting to remove wiper objects. For example, the forward-looking safety warning system may be a lane departure warning system (LDWS), a forward collision warning system (FCWS) or a traffic sign recognition system (TSRS). The forward-looking safety warning system apparatus 120 having built-in in-image periodic noise pixel inpainting may be implemented by software on hardware platforms, or implemented by a programmable integrated circuit such as a microcontroller or a field programmable gate array (FPGA).

In one embodiment, the forward-looking safety warning system apparatus 120 having built-in in-image periodic noise pixel inpainting identifies the pixel group occupied by the wiper in a current frame (i.e., identifies locations of the wiper object pixels in the current frame). According to a pixel relationship between the current frame and a reference frame, the forward-looking safety warning system apparatus 120 having built-in in-image periodic noise pixel inpainting selects a plurality of corresponding pixels from the reference frame to inpaint the pixel group occupied by the wiper object in the current frame. For example, in capturing of the image capturing unit 110, the current frame may have a traffic sign (an object outside the window) completely or partly blocked by the wiper due to the activated wipers. The forward-looking safety warning system apparatus 120 having built-in in-image periodic noise pixel inpainting identifies a plurality of pixels (which are used to inpaint the traffic sign) from an appropriate reference frame to inpaint the wiper pixel group in the current frame. As such, the traffic sign appears (i.e. the traffic sign is inpainted) in the inpainted current frame, i.e., the inpainted current frame does not contain the wiper object. Consequently, the forward-looking safety warning system may have high object recognition accuracy because an object to be recognized is not covered by the wiper object, thereby enhancing driving safety.

Figure 2:
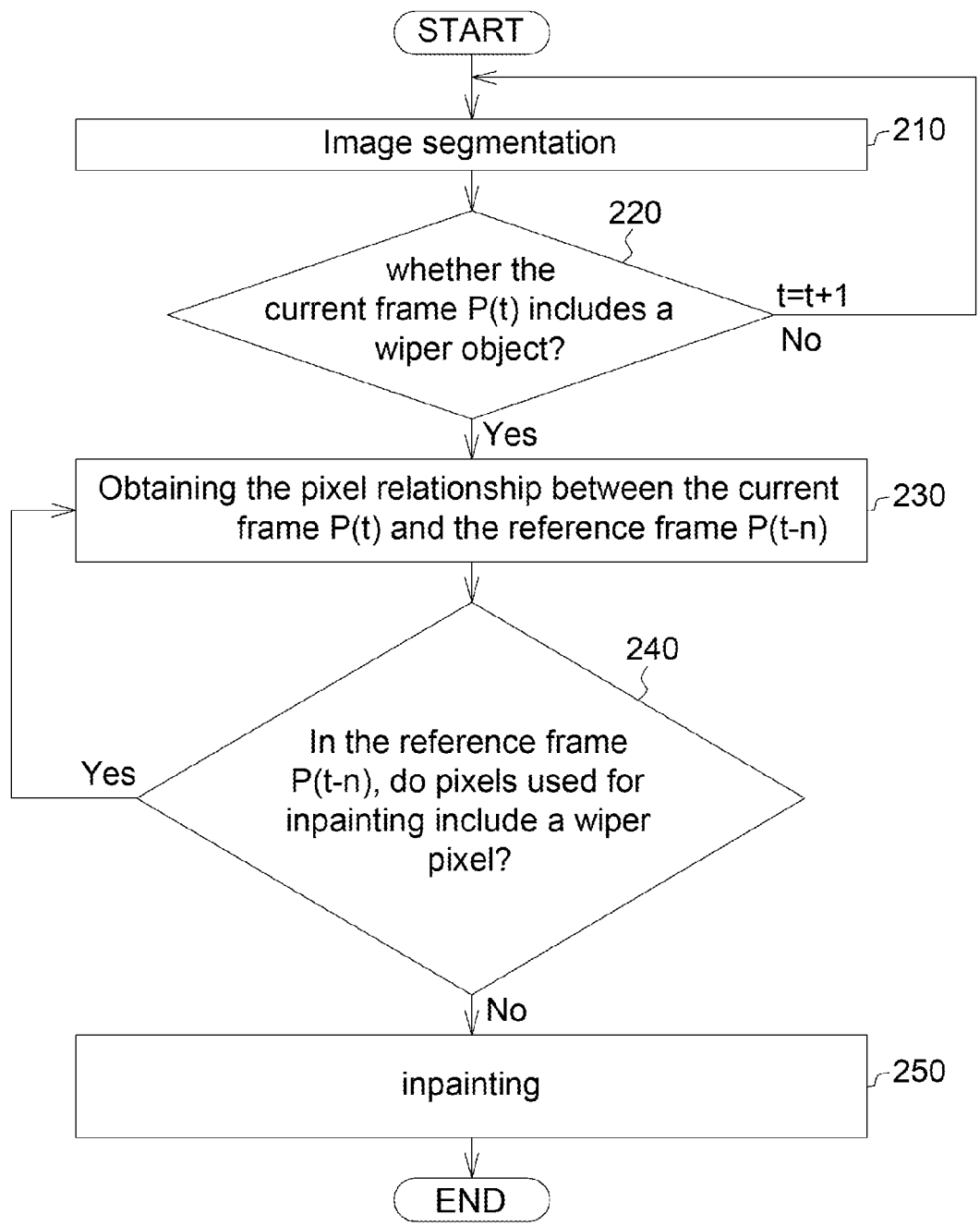
FIG. 2 is a process for inpainting wiper pixels according to one embodiment.

FIG. 2 shows a flowchart of a method for in-image periodic noise pixel inpainting according to one embodiment of the application. In step 210, image segmentation is performed on a current frame P(t). Details for the image segmentation are described with an example. However, it should be noted that other approaches may be adopted for the image segmentation in other embodiments of the application.

Figure 3:
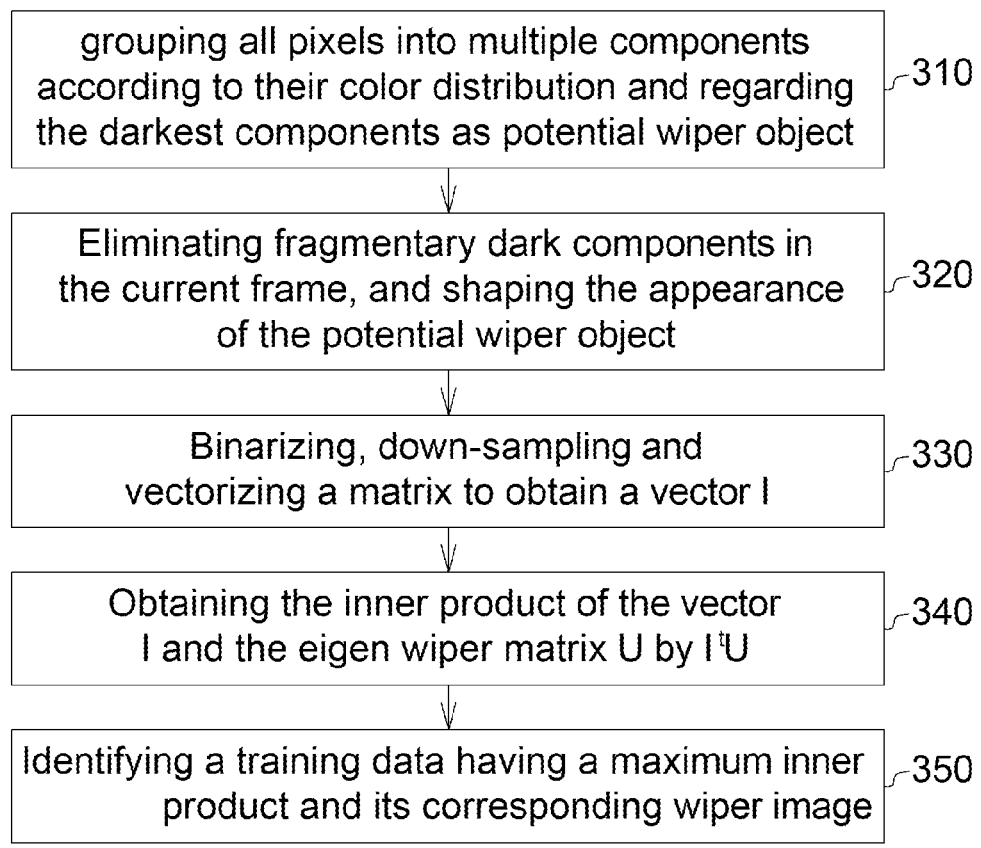
FIG. 3 is an image segmentation process according to one embodiment.

FIG. 3 shows a flowchart for the image segmentation according to one embodiment of the application. In step 310, all pixels (e.g., represented in RGB gray signals) in the current frame are divided into a K number of groups by a K-means algorithm (where K is a positive integer), and dark pixel groups (i.e., pixel groups having darkest RGB intensity) are regarded as one possible component of the wiper object. In other words, in step 310, all pixels are grouped into multiple components according to their color distribution and the darkest components are regarded as potential wiper object. A reason for such is that, the wiper object is usually black and is thus a dark pixel group in a frame, and so the dark pixel groups are regarded as possible wiper components.

In step 320, for the result from step 310, through morphological operations such as erosion and/or dilation algorithms, the fragmentary or incomplete dark pixel groups (i.e. the fragmentary dark components) in the current frame are eliminated, and an appearance of the potential wiper object are shaped to be even more complete. A reason for the above step is because the shape of the wiper is complete, whereas shapes of other dark obstacles (e.g., shadows of the obstacles in image) may be fragmentary. Therefore, in step 320, the fragmentary dark pixel groups are eliminated, and the appearance of the intact or complete pixel groups that are possibly the wiper object is shaped.

In step 330, a result from step 320 is binarized. That is to say, the possible wiper pixel groups are binarized to 1, and the pixel groups considered not containing the wiper object are binarized to 0. The pixels in the current frame is down-sampled to P (where P is a positive integer) pixels, to calculate a total number q (where q is a positive integer) of logic 1 pixels and to obtain q/P as an average value of the binarized wiper image. The average value is subtracted from a p number (where p is a positive integer) of matrix pixels. The obtained matrix is vectorized into a column vector, which is then down-sampled to obtain a vector I.

In step 340, a inner product of the vector I and an eigen wiper matrix U is obtained according to equation (1) below:

$$I^T U \tag{1}$$

The eigen wiper matrix U is trained in an offline state in order to be used in subsequent online determination processes. In one embodiment, the eigen wiper matrix U is obtained as the following. By utilizing a principal component analysis (PCA) algorithm, for an N number of pre-collected training images (where N is a positive integer, and the training images contain the wiper image and are obtained in advance), wiper locations in each of the images are manually marked. That is to say, in each of the N number of training images, coordinates of each of the wiper pixels are known.

In another situation, assuming that the size, location and appearance of the wiper in the frame are different from those in the predetermined trained images (which having wiper objects) due to a wiper and an viewing angle of a video camera in the automobile having the forward-looking safety warning system of the embodiment, an automatic human interface training may also be designed. In the automatic human-interface training, a pure white background object (e.g., a white sheet of paper) is placed in front of the video camera for the video camera to capture an all-white frame. Next, when the wiper is activated, steps 310 and 320 or steps 510 and 520 are performed to accurately and automatically capture (learn) wiper images without any noise.

A plurality of wiper images trained in step 320 is processed in step 330, and the processed results are arranged into an observation matrix of P×N. Equation (2) below is solved by singular value decomposition.

$$O = UDV^T \tag{2}$$

In equation (2), U is the eigen wiper matrix of P×N; D is a diagonal matrix of N×N which records importance or significance of each eigen wiper; and V, a matrix of N×N, records coefficients projected by the N number of training images in an eigen wiper space.

In step 350, online classifying is performed. After obtaining the inner products of the N number of training images, the original wiper image corresponding to the training data having a maximum inner product is identified. Since the N number of training data is identified in advance in the offline training phase, the wiper locations of the N training data are known.

In an alternative embodiment, apart from a clustering algorithm, a morphology algorithm and principal component analysis, the image segmentation processing may also be implemented by one or a combination of any algorithm which could determine the coordinates of a plurality of wiper pixels.

Step 220 is performed after step 210 to determine whether the current frame P(t) includes a wiper object. More specifically, in the current frame P(t), if the maximum value among the N number of inner products calculated by I$^r$U is greater than a predetermined threshold, it is determined that the current frame P(t) includes a wiper object, and subsequent steps are performed for image inpainting. On the contrary, in the current frame P(t), if the maximum value among the N number of inner products calculated by I$^r$U is smaller than the predetermined threshold, it is determined that the current frame P(t) does not include a wiper object. A reason for the above conclusion is that, when a dark pixel group in the current frame P(t) does not match wiper shapes of N trained data, the N number of inner products calculated according to I$^r$U have smaller values.

Details for obtaining a pixel relationship between the current frame and the reference frame in step 230 are described shortly. When an automobile is driven, a forward-looking safety warning system captures images in front of the automobile. To achieve real-time image inpainting, a reference frame for inpainting the current frame P(t) needs to be earlier than the current frame P(t). However, in non-real-time image inpainting, a reference frame for inpainting the current frame P(t) may be earlier or later than the current frame P(t).

In a situation of an immobile background while the automobile moves forward, a background object in an earlier captured image is smaller than the background object in a later captured image. Therefore, during image inpainting, the wiper pixels in the current frame P(t) cannot be inpainted by pixels at the same locations in a reference frame P(t–n) (where n is a positive integer) in one embodiment.

Hence, in the embodiment, the pixel relationship between two frames is modeled through an affine transformation matrix, a projective transformation matrix, or any other transformation matrix or transformation formula that adequately describes the pixel relationship between two frames. That is to say, for an object occurring in both two frames, the affine transformation matrix describes the pixel relationship between the two frames. For example, assuming that an object has a pixel location Pi1 in a frame 1 and a pixel location Pi2 in a frame 2, an affine transformation matrix describes the relationship between the pixel locations Pi1 and Pi2.

In the embodiment, to obtain the affine transformation matrix, a scale-invariant feature transform (SIFT) algorithm, a speeded up robust features (SURF) algorithm, or any other algorithm capable of obtaining feature correspondences between two frames can be employed to identify a plurality of non-wiper feature points (e.g., non-periodic-noise feature points) from the reference frame P(t–n), to identify a plurality of non-wiper feature points from the current frame P(t) (to perform feature point matching), and to identify feature correspondences in the two frames. Next, by substituting the feature correspondences (common feature points) of the reference frame P(t–n) and the current frame P(t) in a random sample consensus (RANSAS) algorithm, a least-squares method, or any other algorithm capable of solving an over-determined system, the affine transformation matrix can be obtained, i.e., $\alpha_x$ and $\alpha_y$ in equation (3) below are obtained.

$$\begin{bmatrix} X_{t-n} \\ Y_{t-n} \\ 1 \end{bmatrix} = \begin{bmatrix} \alpha_x & 0 & (1-\alpha_x)C_x \\ 0 & \alpha_y & (1-\alpha_y)C_y \\ 0 & 0 & 1 \end{bmatrix} \begin{bmatrix} X_t \\ Y_t \\ 1 \end{bmatrix} \quad (3)$$

In equation (3), $C_x$ and $C_y$ are coordinates of a center of the current frame P(t), $(X_t, Y_t)$ is the feature point in the current frame P(t), and $(X_{t-n}, Y_{t-n})$ is the feature point in the reference frame P(t–n). That is to say, $(X_{t-n}, Y_{t-n})$ and $(X_t, Y_t)$ are the feature correspondences, i.e. the same point represented by image at time t and time t–1 respectively. At this point, step 230 is complete.

Again refer to FIG. 2. In the embodiment, pixels in the reference frame P(t–n) are utilized to inpaint wiper pixels in the current frame P(t). The pixels, utilized for inpainting, in the reference frame P(t–n) cannot be wiper pixels. In step 240, it is determined in the reference frame P(t–n), whether any pixel for inpainting the wiper pixels of the current frame P(t) contains a wiper pixel. If yes in step 240, step 230 is iterated, and another previous frame (n=n–1) is utilized as a reference frame to repeat steps 230 and 240 until in the reference frame, pixels for inpainting the wiper pixels in the current frame P(t) do not contain any wiper pixel. That is, in the embodiment, when returning to step 230 from step 240, the affine transformation matrix between another reference frame P(t–n) and the current frame P(t) is again obtained until in the reference frame, the pixels for inpainting the wiper pixels in the current frame P(t) do not contain any wiper pixel.

In the embodiment, a capturing rate of the image capturing unit 110 and a wiper frequency (i.e., a moving speed of the wiper) are considered. For example, when the image capturing unit 110 is a high-speed video camera and the frequency of the wiper is low, it is possible that first few frames (e.g., P(t–1) to P(t–5)) include wiper pixels. In the above situation, it is apparent that a frame P(t–6) is more suitable for inpainting the current frame P(t).

After steps 230 and 240, the reference frame for inpainting the current frame P(t) can be identified. Thus, in step 250, inpainting is performed to remove the wiper object. For example, in step 250, in equation (3), $\alpha_x$, $\alpha_y$, $C_x$, $C_y$, $X_t$ and $Y_t$ are known (($X_t, Y_t$) are locations of the wiper pixel in the current frame P(t) to be inpainted), and $(X_{t-n}, Y_{t-n})$ representing a location of the pixel (which are utilized for inpainting) in the reference frame P(t–n) can be obtained according to equation (3). After the location $(X_{t-n}, Y_{t-n})$ of the pixels for inpainting are obtained, the pixels can be then utilized for inpainting the wiper pixel of the current frame P(t).

Figure 4A:
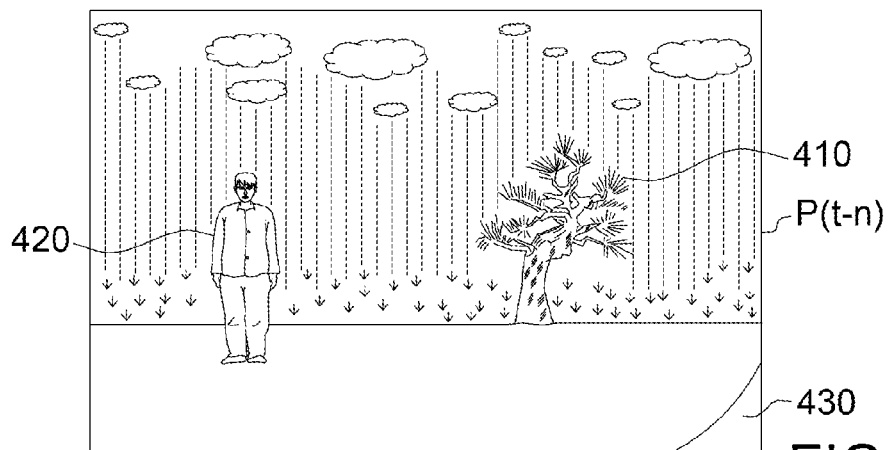
FIGS. 4A to 4C show in-image periodic noise pixel inpainting according to one embodiment.
Figure 4B:
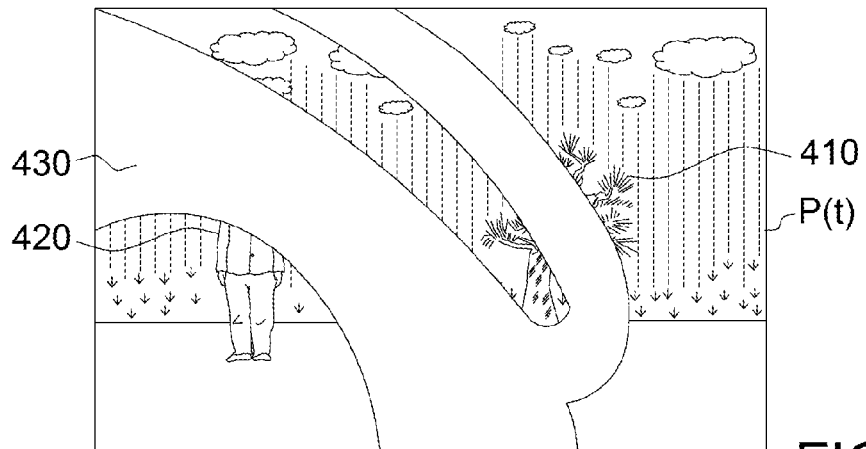
Figure 4C:
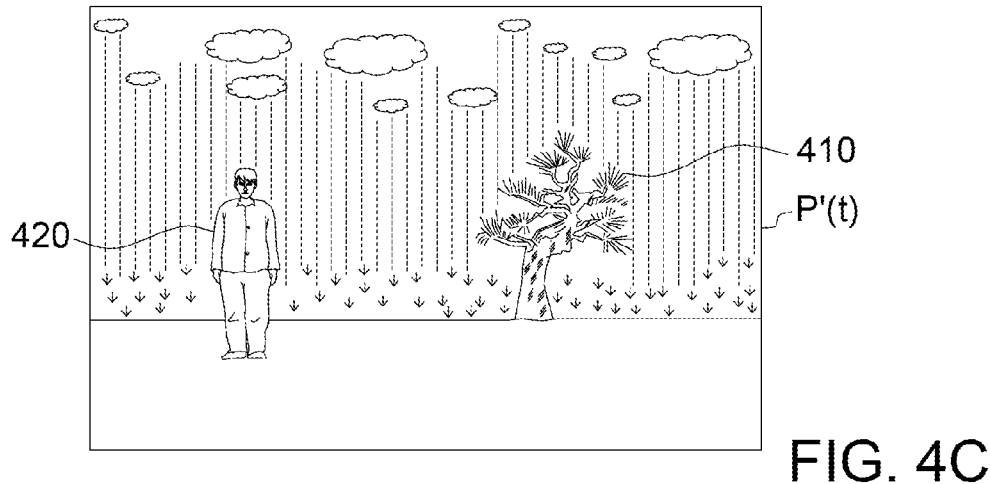

FIGS. 4A to 4C are schematic diagrams for in-image periodic noise pixel inpainting according to one embodiment. As shown in FIG. 4A, it is assumed that, the reference frame P(t–n) includes a tree object 410 and a person object 420, neither of which is covered by a wiper object 430. As shown in FIG. 4B, in the current frame P(t), the tree object 410 and the person object 420 are both blocked by the wiper object 430. With the in-image periodic noise pixel inpainting according to one embodiment, the tree object 410 and the person object 420 in the reference frame P(t–n) are utilized for inpainting the tree object 410 and the person object 420 which are blocked by the wiper object 430 in the current frame P(t) to obtain a inpainted current frame P'(t), as shown in FIG. 4C. Thus, the inpainted current frame P'(t) no longer contains the wiper object 430, and the tree object 410 and the person object 420 in the inpainted current frame P'(t) are not blocked by the wiper object 430.

Due to the angle and restrictions of the captured image, in the current/reference frame in FIGS. 4A to 4C, only a part of one wiper between a pair of wipers is shown. It should be noted that FIGS. 4A to 4C are drawn for illustrating the disclosure.

Figure 5A:
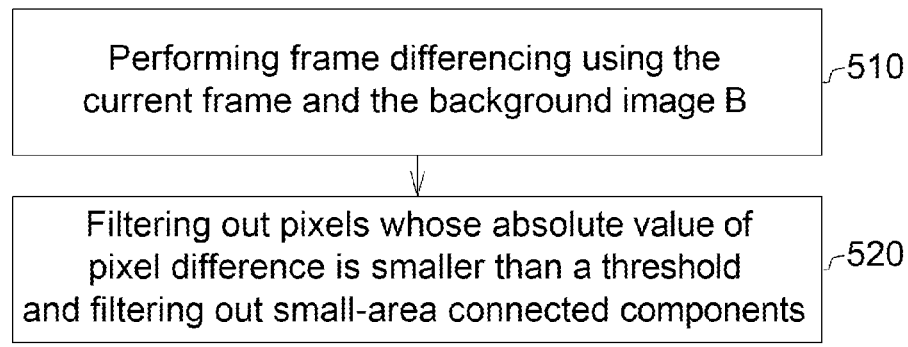
FIGS. 5A and 5B show a process for determining whether a current frame includes a periodic noise pixel group (e.g., a wiper pixel group) according to another embodiment.
Figure 5B:
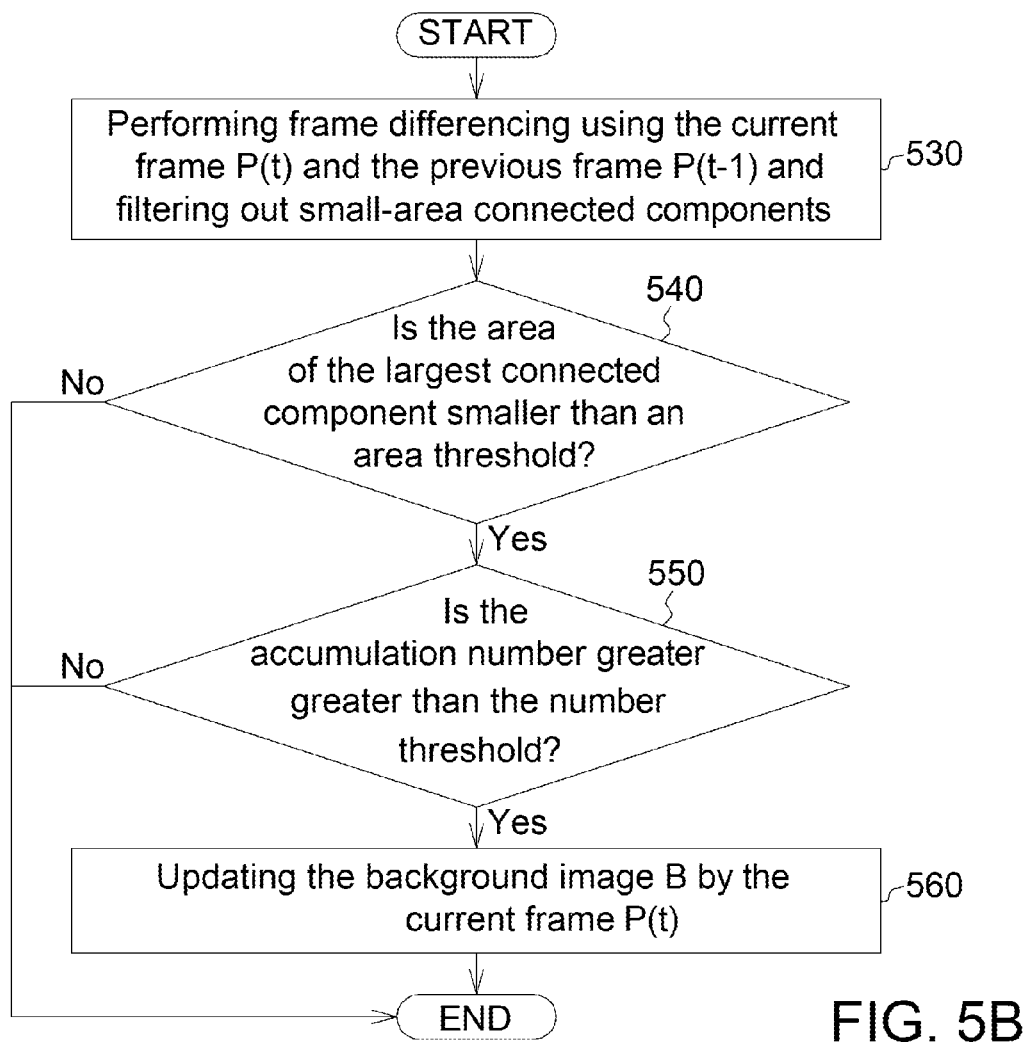

According to another embodiment, another process for determining whether a current frame includes a periodic noise pixel group (e.g., a wiper pixel group) is provided. FIGS. 5A and 5B are flowcharts for determining whether a current frame includes a periodic noise pixel group (e.g., a wiper pixel group) according to another embodiment. Referring to FIG. 5A, the process in FIG. 5A is equivalent to steps 310 and 320 in FIG. 3.

Compared to a background image, a wiper object in consecutive images may appear suddenly, occupy a lot of pixels and look relatively dark. Hence, in an alternative embodiment, the K-means algorithm is replaced by a frame differencing method. That is, steps 510 and 520 in FIG. 5A achieve the same/similar effects as steps 310 and 320 in FIG. 3.

A background B is a frame without the wiper. In step 510, one of the current frames is subtracted from the background image B to obtain a pixel difference between the two frames. A pixel difference is a difference between one pixel in the current frame and the pixel at the same location in the background image B. In other words, in step 510, frame differencing is performed using the current frame and the background image B. In step 520, if an absolute value of the pixel difference of a pixel is smaller than a threshold, the pixel is filtered out, and every connected component occupying small area (i.e. the small-area connected components) is also filtered out.

The reason to filter out a pixel having an absolute value of the pixel difference smaller than a threshold is as follows. As previously described, wiper pixels are usually dark pixels, and so an absolute value of the pixel difference between the wiper pixel in the current frame and the pixel at the same location in the background frame is expected to be greater than the threshold. Therefore, it is inferred that, a pixel having an absolute value of the pixel difference smaller than a threshold is a non-wiper pixel, and is filtered out.

A connected component refers to a component formed by connecting neighboring pixels that are not filtered out. When the area of a connected component is too small (i.e., the area is smaller than an area threshold), the connected component is filtered out. The area of wiper pixels is usually quite large, meaning that a connected component having a small area is unlikely a component formed by wiper pixels and is thus filtered out.

FIG. 5B shows details about how to identify the background image B according to one embodiment. In step 530, one of the current frame P(t) and the previous frame P(t−1) is subtracted from the other (i.e. a frame differencing is performed using the current frame P(t) and the previous frame P(t−1)), and the connected component having a small area is filtered out, as previously described. In step 540, if the area of a largest connected component is smaller than an area threshold, the current frame P(t) is likely the background image, and an accumulation number is added by 1. When a result in step 540 is negative, it is determined that the current frame P(1) is not the background image (i.e., the current frame P(t) may include wiper pixels).

In step 550, it is determined whether the accumulation number is greater than a number threshold. The number threshold is associated with the capturing speed of a video camera, and is higher if a high-speed video camera is utilized for capturing, images. When the results of steps 540 and 550 are both confirmative, in step 560, the background image B is updated by the current frame P(t). In principle, compared to changes in a background image, consecutive and large-area pixel changes in frames can be mainly caused by the wiper object. Therefore, if little change occurs in several consecutive frames, the current frame P(t) may be regarded as a background image.

Further, the background image B should be continuously updated. The process in FIG. 5B is repeated to identify a new background image B among consecutive images.

In one embodiment, the method for in-image periodic noise pixel inpainting may be performed through various approaches. For example, in one approach, the method for in-image periodic noise pixel inpainting of the embodiment may be performed once the wipers are activated by the driver. When the wipers are activated, the captured image can include the wiper image. In another approach, if whether the captured image includes the wiper periodic noise pixels is determined by another method, the method for in-image periodic noise pixel inpainting of the embodiment is performed.

In associated descriptions of the above embodiments, in a real-time operation application, a reference frame for inpainting may be any previous frame sufficient for inpainting the current frame; in a non-real-time operation application, a reference frame for inpainting may be any previous frame or any following frame sufficient for inpainting the current frame.

Further, the method for in-image periodic noise pixel inpainting may be installed in a computing device such as an embedded system, e.g., a smart handset, a personal computer and a desktop computer, which may have one core or multicore, and execute one or more program instructions.

The embodiment is capable of eliminating in-image periodic noise pixels (e.g., wiper objects). Even when a driver activates the wiper in the rain, a recognition rate of the forward-looking safety warning system may be maintained to enhance driver's safety.

In the method for in-image periodic noise pixel inpainting according to the embodiment, (1) whether the image includes a wiper object and (2) locations of wiper pixels may be determined even without a wiper signal. Thus, without complicating the installation of the system, the robustness of the forward-looking safety warning system is enhanced.

In an alternative embodiment, it may be determined whether the method for in-image periodic noise pixel inpainting in the embodiment is to be performed through reception of a wiper signal. With such approach, not only a computation load but also a misjudgment rate can be reduced.

Reception of the wiper signal may also notify the forward-looking safety warning system having the method for in-image periodic noise pixel inpainting of the embodiment about "whether the wiper is operating". Further, whether to activate the wipers may be manually determined or automatically determined by raindrop sensors. For example, the raindrop sensor is an optical reflective sensor or an audio sensor or a conductive sensor or any combination thereof, which detects whether it is raining.

In conclusion of the embodiments, when the wiper is activated, the wiper is detected and rendered transparent (i.e., the pixels blocked by the wiper are inpainted) by utilizing image segmentation and image inpainting techniques, so as to make obstacle recognition stay unaffected by the periodic noise pixels coming from the wiper. Therefore, a recognition rate for obstacles as well as driving safety in the rain can be enhanced.

In one embodiment, the method for in-image periodic noise pixel inpainting may be implemented by a processing unit, a digital signal processing unit, a digital video processing unit, or a programmable integrated circuit such as a microcontroller or an FPGA, which may be designed based on hardware description language (HDL).

Alternatively, the method for in-image periodic noise pixel inpainting may be implemented through software. For example, a program for executing the method for in-image periodic noise pixel inpainting of the embodiment may be stored in a storage medium, e.g., a memory, a ROM, RAM, an optical recording medium, a magnetic recording medium, or other types of recording media. Further, the method for in-image periodic noise pixel inpainting may be implemented through firmware. When a processing unit of an operation device accesses and executes the program from the storage medium, the method for in-image periodic noise pixel inpainting of the embodiment can be implemented. Moreover, the method for in-image periodic noise pixel inpainting of the embodiment may be implemented through a combination of hardware and software.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for in-image periodic noise pixel inpainting, comprising:
   determining whether a current frame comprises a periodic noise pixel group, and identifying locations of pixels of the periodic noise pixel group in the current frame if the current frame comprises the periodic noise pixel group;
   matching a plurality of non-periodic-noise pixels in the current frame with a plurality of non-periodic-noise pixels in a reference frame to obtain a pixel relationship between the current frame and the reference frame; and
   selecting corresponding pixels from the reference frame to inpaint the periodic noise pixel group in the current frame according to the locations of the pixels of the periodic noise pixel group in the current frame and the pixel relationship;
   wherein the pixel relationship between the current frame and the reference frame is modeled by an affine transformation matrix, a projective transformation matrix, or a transformation matrix or a transformation formula which describes the pixel relationship between two frames;
   a plurality of non-periodic-noise feature correspondences in the reference frame, a plurality of non-periodic-noise feature correspondences in the current frame, and a pixel relationship between the non-periodic-noise feature points in the reference frame and the non-periodic-noise feature points in the current frame are identified by a scale-invariant feature transform (SIFT) algorithm or a speeded up robust features (SURF) algorithm; and
   a plurality of feature correspondences of the reference frame and the current frame is substituted by a random sample consensus (RANSAS) algorithm or a least-squares method to obtain the affine transformation matrix.

2. The method for in-image periodic noise pixel inpainting according to claim 1, wherein the current frame and the reference frame are captured by an image sensor, which is an infrared image capturing device, a photoelectric coupling element, and/or a complementary metal-oxide semiconductor (CMOS) photosensitive element.

3. The method for in-image periodic noise pixel inpainting according to claim 1, wherein the periodic noise pixel group includes a plurality of wiper pixels.

4. The method for in-image periodic noise pixel inpainting according to claim 1, wherein an image segmentation step determines whether the current frame comprises the periodic noise pixel group and identifies the locations of the pixels of the periodic noise pixel group.

5. The method for in-image periodic noise pixel inpainting according to claim 4, wherein the image segmentation step comprises:
   dividing all pixels of the current frame into a plurality of groups, and regarding at least one dark pixel group as a possible periodic noise pixel group;
   eliminating at least one incomplete dark pixel group in the current frame, and shaping the appearance of a complete dark pixel group;
   binarizing and down-sampling the current frame to obtain a binarized average for obtaining a vector;
   obtaining an inner product from the vector and a pre-trained eigen matrix; and
   determining whether the current frame comprises the periodic noise pixel group according to the inner product.

6. The method for in-image periodic noise pixel inpainting according to claim 4, wherein the image segmentation step comprises:
   subtracting the current frame from a background image, wherein the background image does not contain any periodic noise pixel group;
   filtering out a pixel having an absolute value of a pixel difference smaller than a threshold from the current frame, wherein the pixel difference is a difference between a pixel in the current frame and the pixel at the same location in the background image;
   filtering out any connected components having an area smaller than an area threshold, wherein each connected component is formed by connecting a plurality of unfiltered out pixels;
   binarizing and down-sampling the current frame to obtain a binarized average for obtaining a vector;
   obtaining an inner product from the vector and a pre-trained eigen matrix; and
   determining whether the current frame comprises the periodic noise pixel group according to the inner product.

7. The method for in-image periodic noise pixel inpainting according to claim 6, further comprising:
   subtracting the current frame from a previous frame; and
   updating the current frame as the background image if the area of a largest connected component is smaller than the area threshold and an accumulation number is greater than a number threshold, wherein if the area of the largest connected component is smaller than the area threshold, the accumulation number is added by 1.

8. The method for in-image periodic noise pixel inpainting according to claim 1, wherein the periodic noise pixel group of the current frame is substituted into the affine transformation matrix to obtain locations of a plurality of corresponding pixels of the reference frame for inpainting.

9. The method for in-image periodic noise pixel inpainting according to claim 1, wherein the reference frame is earlier than the current frame in a real-time operation application, and is earlier or later than the current frame in a non-real-time operation application.

10. The method for in-image periodic noise pixel inpainting according to claim 1, which is applicable to be deployed to a computing device, an embedded system, a smart handset or a personal computer which executes one or more program instructions.

11. The method for in-image periodic noise pixel inpainting according to claim 1, further comprising:

receiving a wiper signal to determine whether to initiate the method for in-image periodic noise pixel inpainting, wherein the periodic noise pixel group is a wiper pixel group.

12. The method for in-image periodic noise pixel inpainting according to claim 11, wherein it is determined whether a wiper is operating according to the wiper signal; and the wiper is activated according to a wiper activation event or according to whether it is raining as determined by a raindrop sensor.

13. The method for in-image periodic noise pixel inpainting according to claim 12, wherein the raindrop sensor is an optical reflective sensor or an audio sensor or a conductive sensor, or any combination thereof.

* * * * *